June 24, 1930. R. W. FISHER 1,767,750
SPRING SUSPENSION FOR VEHICLE BODIES
Filed May 1, 1926  2 Sheets-Sheet 2
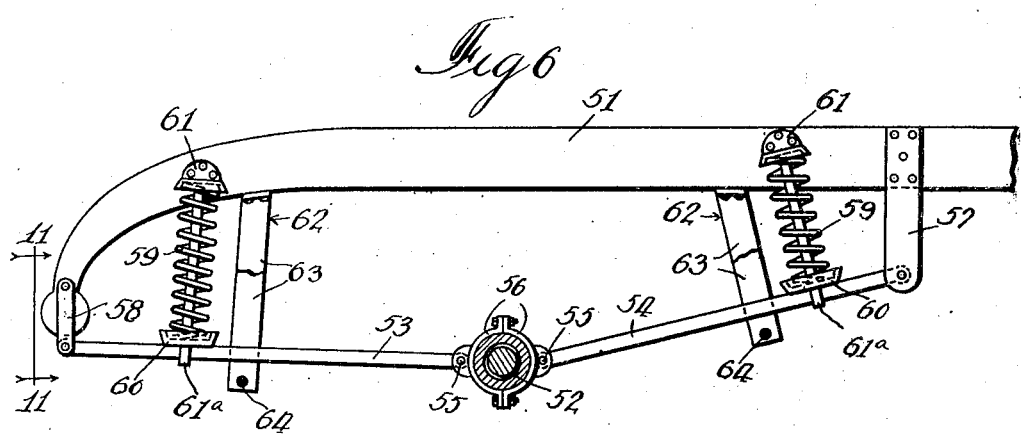
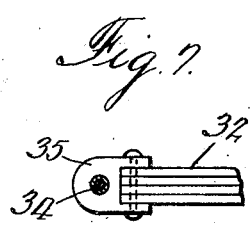
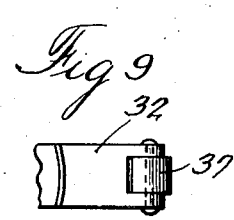
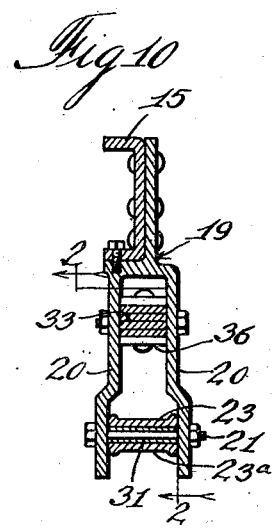
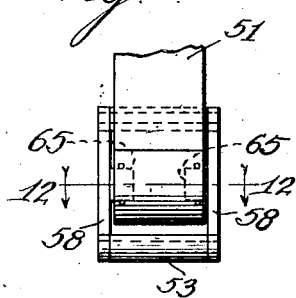
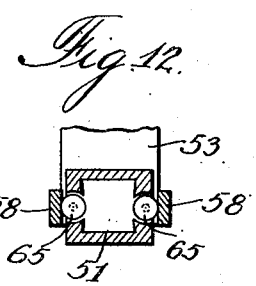
Inventor:
Russell W. Fisher
By Arthur L. Sprinkle
Atty.

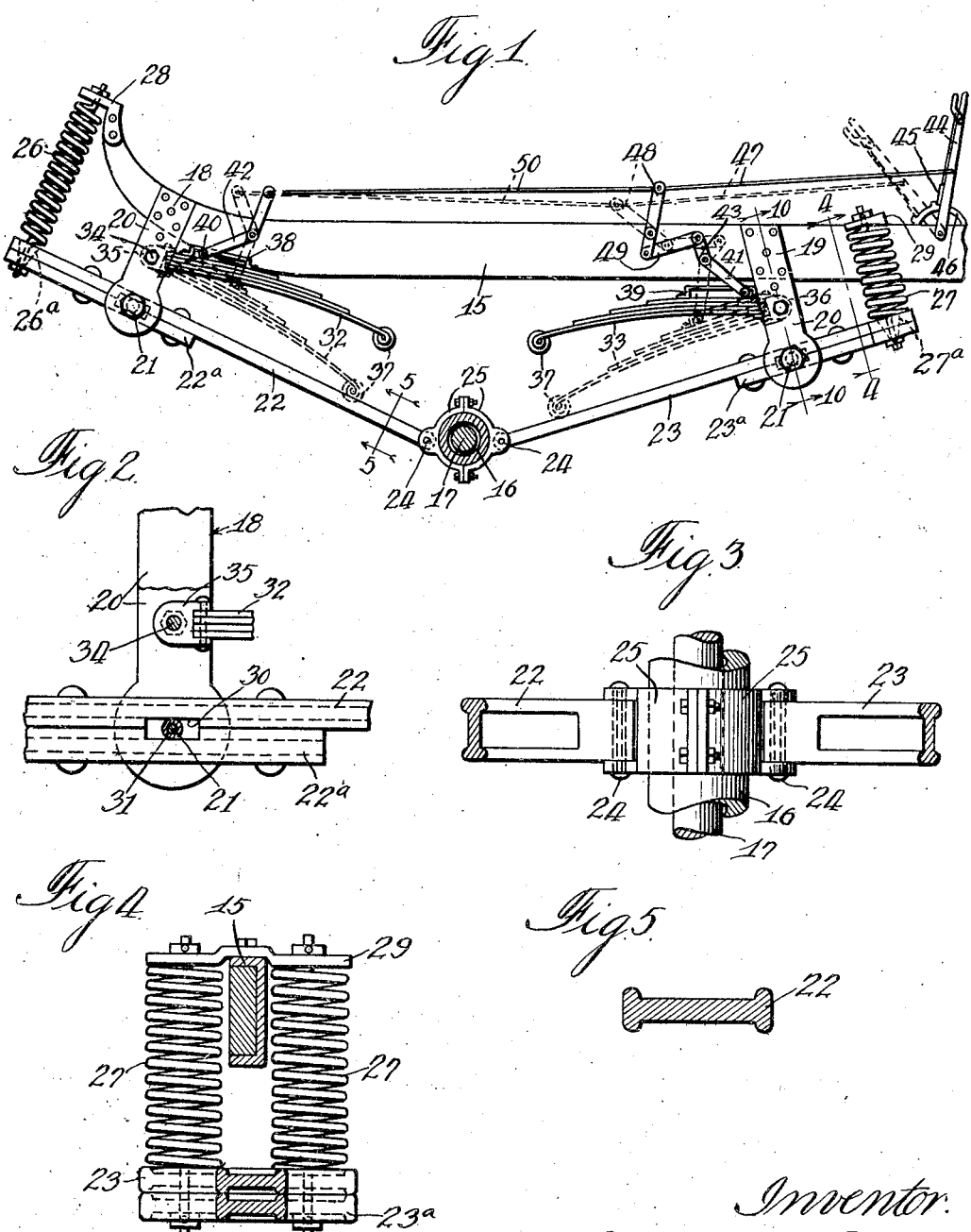

Patented June 24, 1930

1,767,750

UNITED STATES PATENT OFFICE

RUSSELL W. FISHER, OF NOBLESVILLE, INDIANA

SPRING SUSPENSION FOR VEHICLE BODIES

Application filed May 1, 1926. Serial No. 105,925.

This invention relates to spring suspension for vehicle bodies and is particularly adaptable for use in connection with the chassis of motor cars or other road vehicles, and in the present instance will be described with reference to its application to a motor vehicle.

Heretofore in vehicle construction it has been the practice to provide spring suspension capable of supporting the maximum load to be carried by the vehicle. This practice necessarily means heavier springs than are necessary for supporting lighter loads, which condition is not conducive to easy riding of the vehicle when less than the maximum load is carried thereby.

One of the objects of the present invention is to provide an improved construction whereby the load supporting elements of the device may be readily adapted to loads of various weights, thereby contributing to the easy riding qualities of the vehicle regardless of the load.

A further object of the invention is to provide an improved construction tending to reduce the vertical movement of the body by absorbing road shocks and checking the rebound of the body due to such shocks.

A still further object of the invention is to provide an improved construction and arrangement whereby the wheel base of motor vehicles may be materially shortened and still retain the easy riding qualities of vehicles of a longer base.

These and other objects are accomplished by providing a construction and an arrangement of the various elements of the device substantially in the manner hereinafter described with reference to a preferred embodiment of the invention shown for illustrative purposes in the accompanying drawings, in which Fig. 1 is a fragmentary side elevation of the rear portion of a motor vehicle chassis illustrating an embodiment of my invention applied thereto.

Fig. 2 is an enlarged fragmentary sectional elevation taken on the line 2—2 of Fig. 10, showing the manner of mounting the chassis supporting members.

Fig. 3 is an enlarged fragmentary plan view illustrating the manner of pivotally connecting the chassis supporting members to the axle housing.

Fig. 4 is an enlarged sectional elevation taken, as indicated by the line 4—4 of Fig. 1.

Fig. 5 is an enlarged transverse sectional view through one of the suporting members taken as indicated by the line 5—5 of Fig. 1.

Fig. 6 is a fragmentary side elevation of a portion of a motor vehicle chassis illustrating a slightly modified construction embodying my invention.

Fig. 7 is a fragmentary side elevation of one of the auxiliary cushioning members.

Fig. 8 is a sectional elevation through one of the auxiliary cushioning members illustrating the manner of connecting actuating means thereto.

Fig. 9 is a fragmentary plan view of one end of an auxiliary cushioning member illustrating the manner of mounting an antifriction roller thereon.

Fig. 10 is a sectional elevation taken on the line 10—10 of Fig. 1.

Fig. 11 is a rear elevation of a portion of the modified arrangement as viewed in the direction of the arrows 11—11 in Fig. 6, and Fig. 12 is a plan section taken on the line 12—12 of Fig. 11.

The drawings illustrate the invention as applied to one side of a motor vehicle frame or body, it being understood that a like structure may be applied to both sides of the vehicle as well as to the front and rear thereof.

Referring particularly to Figs. 1 to 5 inclusive and 7 to 10 inclusive of the drawings, the embodiment of the invention shown therein includes a frame or body member 15 typifying the side frames of a motor vehicle chassis adapted to be movably supported on an axle housing 16 having a supporting axle 17 rotatably mounted therein.

To resiliently support the chassis on the housing 16 in a manner to cushion the shocks due to uneven road conditions, the member 15 may be provided with brackets 18 and 19 longitudinally spaced thereon and secured thereto, the brackets being bifurcated at their lower ends below the member 15 to form leg portions 20 as illustrated in Fig. 10. Pivotally connected to the leg portions 20 by means of bolts 21 and intermediate their ends are lever arms 22 and 23, preferably of substantially I-beam construction, as shown in Fig. 5, and having their inner or adjacent ends pivotally connected by means of bolts 24 to the semi-circular clamping members 25 secured to the axle housing 16, and having their outer or opposite ends connected by means of helical tension springs 26 and 27, respectively, to brackets 28 and 29 secured to the frame member 15. The lever arms 22 and 23, at their pivotal connections with the leg portions 20 of the brackets 18 and 19, are provided with longitudinal slots 30 adapted to receive antifriction rollers or bushings 31 surrounding the bolts 21 in a manner to permit of the longitudinal movement of the arms thereon to provide for the relative movement of the housing 16 and frame 15. The slots 30 may be formed by cutting away portions of the lower flanges of the I-beam formation of the arms 22 and 23 and portions of the upper flanges of adjacent co-operating members 22$^a$ and 23$^a$ of similar formation (see Figs. 2 and 10), thereby providing a slot for mounting the arms slidably on the brackets 18 and 19 without weakening the body portion of the arms.

It will be observed from the foregoing description that the frame and body of the vehicle is resiliently supported on the axle housing and that relative movement of the frame and supporting axle is permitted by reason of the slotted connection of the arms 22 and 23 with their respective brackets, and that shocks due to uneven road conditions will be taken up and absorbed by the tension springs 26 and 27, the V-shaped slots 26$^a$ and 27$^a$ formed in the outer ends of the lever arms 22 and 23 respectively, permitting freedom of movement of said springs with respect to said arms.

The invention, as thus far described, is intended for suitably supporting the frame and body under normally light load conditions, it being understood that the springs 26 and 27 are of suitable strength and capacity for that purpose. In the event that it is found desirable to carry an abnormally heavy load on the vehicle, I have provided resilient auxiliary or supplemental supporting devices in the nature of, and shown in the present instance as, one-quarter elliptical leaf springs 32 and 33 pivotally connected at their outer ends to the brackets 18 and 19, respectively, by means of pivot pins or bolts 34 extending through openings in connecting members 35 and 36 secured to the outer ends of the springs. The inner ends of the springs 32 and 33 may be provided with anti-friction rollers 37 adapted, when the auxiliary springs are in operative position, to bear on the upper sides of the arms 22 and 23.

For controlling the operation of the auxiliary supporting devices, the springs 32 and 33 may be provided on their upper sides with longitudinally extending yokes 38 and 39, respectively, adapted to receive transversely extending studs or trunnions 40 and 41 mounted on the lower ends of the bell crank levers 42 and 43, pivotally mounted on the frame member 15, the connection being such that when the levers 42 and 43 are rocked about their pivotal connection on the frame 15, the springs 32 and 33 will be swung about their pivotal connections with the brackets 18 and 19 into and out of operative engagement with the arms 22 and 23.

For controlling the movement of the bell crank levers 42 and 43, a hand lever 44 may be suitably mounted on the body member 15, preferably within easy reach of the driver, and provided with suitable detent mechanism 45 adapted to engage a toothed quadrant 46 mounted on the frame 15 to hold the lever 44 in adjusted position. The lever 44 is connected to the bell crank lever 43 by means of a link 47, lever 48 and short link 49, and with the bell crank lever 42 by means of a link 50 connected to the upper end of the lever 48 in such a manner that when the hand lever 44 is moved from the full line to the dotted line position, as shown in Fig. 1, the auxiliary springs 32 and 33 will be moved about their pivots and the anti-friction rollers 37 brought into operative engagement with the lever arms 22 and 23.

It will be observed from the foregoing description that when the load on the vehicle is increased materially beyond the normal supporting capacity of the helical carrying springs 26 and 27, the auxiliary springs 32 and 33 may be swung into operative engagement with the arms 22 and 23, thereby supplementing the action of the springs 26 and 27, and providing additional resilient supporting means for the vehicle body and its increased load.

In Figs. 6, 11 and 12 is shown a slightly modified construction in which a body or frame member 51 is connected to an axle housing 52 by means of lever arms 53 and 54 having their inner or adjacent ends pivotally connected by means of bolts 55 to the semi-circular clamping members 56 secured to the axle housing. The outer or forward end of the arm 54 may be pivotally connected to a hanger 57 rigidly secured to the member 51, while the outer or rear end of the arm 53 is pivotally connected to the lower ends of shackles or hangers 58 pivotally connected at their upper ends to the rear end of the member 51, thus permitting relative movement of the axle housing 52 and member 51.

For resiliently supporting the frame or body member 51 on the axle housing in this modified construction, there may be provided a plurality of cushioning elements 59 shown in the present instance as helical compression springs adapted to seat at their lower ends in cup-like portions formed on the cross members 60 secured to the arms 53 and 54 intermediate their ends, and at their upper ends in inverted cup-like portions formed on the brackets 61 secured preferably to the sides of the body member 51. Secured to the brackets 61 are rods 61ª extending longitudinally through the springs 59 for retaining the coils of the springs in proper alignment when under compression, and having their lower ends positioned loosely in the brackets 60 in a manner to slide longitudinally therethrough. Secured preferably to the underside of the member 51 are a pair of inverted U-shaped brackets 62 having their depending leg portions 63 positioned on opposite sides of the arms 53 and 54 and provided at their lower ends with pins or bolts 64 extending transversely of and beneath the arms 53 and 54, in a manner to limit the relative movement of the member 51 and housing 52 and to serve as stops for checking the rebound of the vehicle body due to uneven road conditions.

To obviate the possibility of friction and consequent binding between the shackles or pivoted hangers 58 and body member 51, due to lateral thrusts, the portion of the body member extending between the shackles may be provided on its opposite sides with anti-friction rollers 65 having their outer peripheries extending beyond the sides of the members 51 in a manner to engage the inner surfaces of the shackles 58.

It will be observed from the foregoing description that by reason of the improved construction and arrangement shown and described, the present invention produces a maximum cushioning effect and permits only a minimum of road shocks to be transmitted to the body of the vehicle, thereby permitting the shortening of the wheel base of a vehicle to a material degree without dispensing with the easy riding qualities of vehicles having a longer base.

Obviously, the present invention is not limited to the specific construction and arrangement shown in the illustrative device, but may be variously modified without departing from the spirit of the invention. Moreover, it is not essential that all the features of the invention be used conjointly as they may be used to advantage in variously different combinations and sub-combinations.

What I claim as my invention and desire to secure by letters patent is:

1. In a device of the class described, the combination of a frame, an axle housing, means for supporting said frame resiliently on said housing, auxiliary supporting means comprising a leaf spring associated with said first mentioned means and pivotally mounted with respect to said frame, and means mounted on said frame for positioning the free end of said auxiliary means in operative or inoperative relation with respect to said first mentioned supporting means.

2. In a device of the class described, the combination of a frame, an axle, a plurality of hangers secured to said frame, a plurality of arms connected with said axle and to said hangers in a manner to permit oscillatory and longitudinal movement of said arms with respect to said hangers, means co-operable with said arms and frame for supporting said frame resiliently in relation to said axle, auxiliary supporting means for supporting said frame, and means for controlling the position of said auxiliary supporting means.

3. In a device of the class described, the combination of a frame, an axle housing, a plurality of hangers secured to said frame, a plurality of arms connected to said housing and to said hangers in a manner to permit oscillatory and longitudinal movement of said arms with respect to said hangers, means co-operable with said arms and frame for supporting said frame resiliently on said housing, auxiliary supporting means co-operable with said frame and arms for supporting said frame, and means for positioning said auxiliary means in operative or inoperative relation with respect to said arms.

4. A spring suspension for motor vehicles comprising, in combination, a frame, a plurality of hangers secured thereto, an axle, a plurality of lever arms pivotally connected at one end with said axle and pivotally and slidably connected intermediate their ends to said hangers, and resilient means connecting the other ends of said arms to said frame for supporting the frame in relation to said axle.

5. A spring suspension for motor vehicles comprising, in combination, a frame, a plurality of hangers secured thereto, an axle housing, a plurality of lever arms pivotally connected at one end to said housing and pivotally and slidably connected intermediate their ends to said hangers, resilient means connecting the other ends of said arms to said frame for supporting the frame on said housing, and resilient means pivotally mounted on said hangers and co-operable with said arms for providing additional support for said frame, and means for controlling the position of said last mentioned resilient means with respect to said arms.

6. A spring suspension for motor vehicles, comprising, in combination, a frame, a plurality of hangers secured thereto, an axle, a plurality of rigid lever arms pivotally connected at their inner or adjacent ends with said axle and having longitudinal slots intermediate their respective ends adapted to receive pins for pivotally and slidably connecting said arms to said hangers, tension springs connecting the outer or opposite ends of the respective arms to said frame, leaf springs pivotally mounted on said hangers and provided with anti-friction rollers at their free ends adapted to bear on the upper sides of said arms, and means mounted on said frame and operatively connected to said leaf springs for moving said rollers into and out of engagement with said arms.

7. In a device of the class described, the combination of a frame, an axle, a plurality of hangers connected to said frame, a plurality of arms pivotally connected with said axle at each end thereof and being connected intermediate their ends with said hangers, means co-operable with the free ends of said arms and said frame for supporting said frame resiliently in relation to said axle, and auxiliary supporting means mounted in said hangers for assisting said first mentioned means in supporting said frame.

In testimony whereof I have signed my name to this specification, on this 20th day of April A. D. 1926.

RUSSELL W. FISHER.